June 5, 1951  W. BOON  2,556,058
PNEUMATIC CONVEYER SYSTEM
Filed May 3, 1945  2 Sheets-Sheet 1
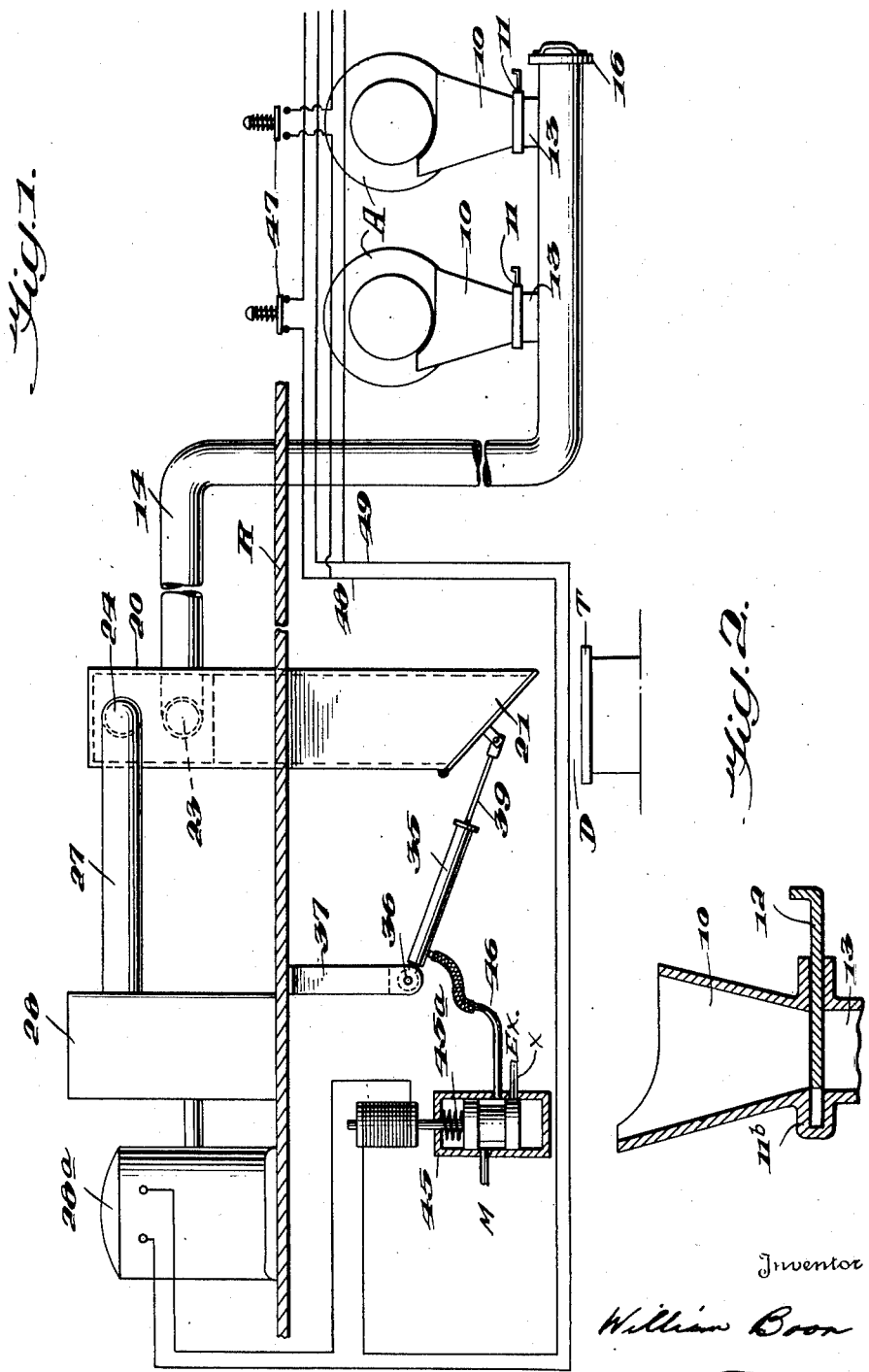

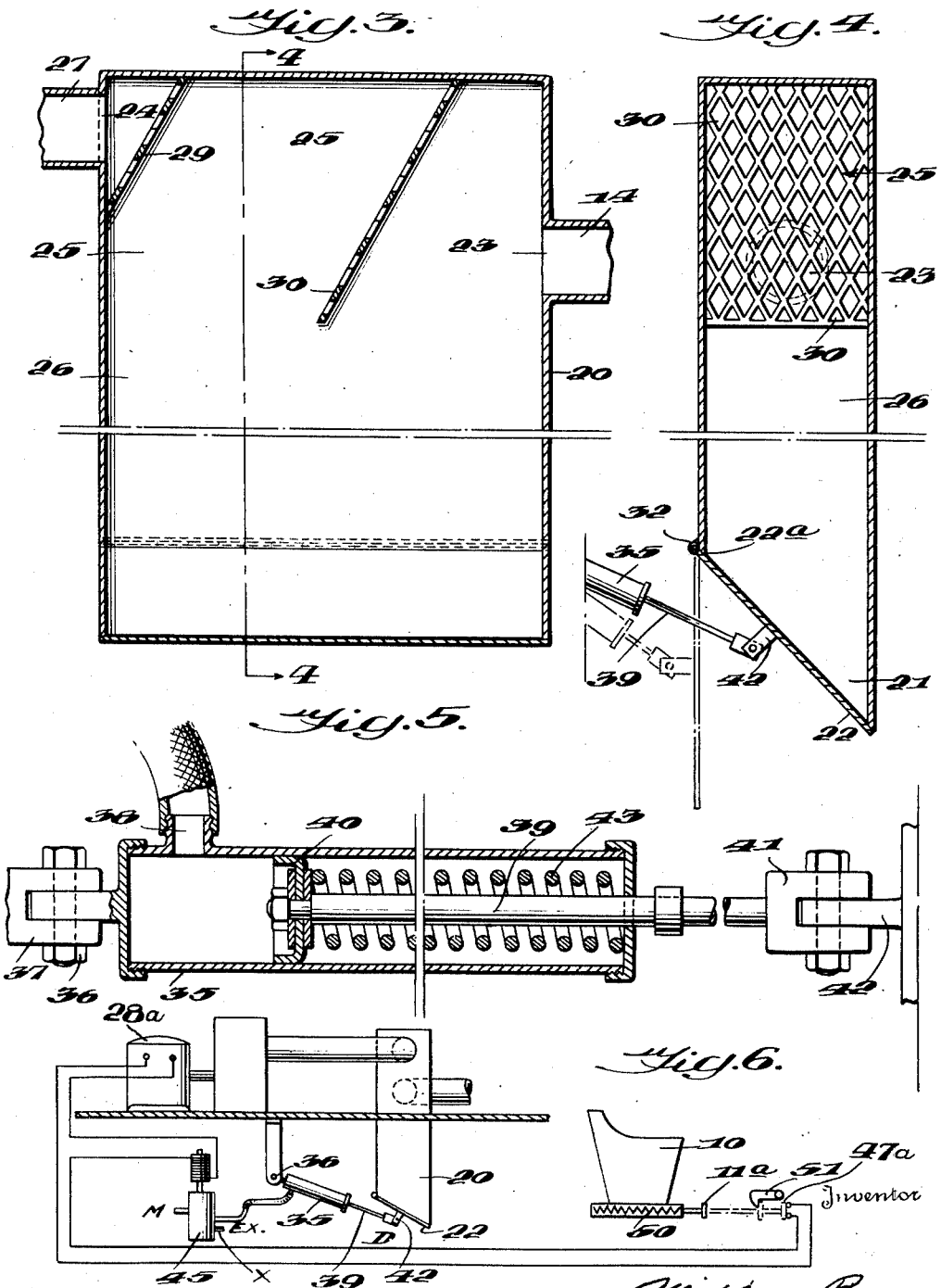

Patented June 5, 1951

2,556,058

UNITED STATES PATENT OFFICE 2,556,058

PNEUMATIC CONVEYER SYSTEM

William Boon, East Paterson, N. J., assignor to The Eastern Cyclone Conveyor System, Inc., Passaic, N. J., a corporation of New Jersey Application May 3, 1945, Serial No. 591,793

8 Claims. (Cl. 307—17)

The present invention relates to conveying systems, particularly pneumatic conveying systems, and aims generally to provide a simplified improved apparatus for conveying materials and articles from a feeding or intake position to a remote delivery station.

One of the primary objects of the invention is the provision of a conveying system including a material collector at the discharge station, which collector is normally and automatically open when the system is idle but is closed when the system is in operation.

A further object of the invention is the provision of an improved pneumatic conveying system for conveying bulky articles, such as garments, fabric pieces and the like from a feeding position to a remote discharge station, even though such conveying may include upward travel of the article against the action of gravity.

A still further object of the invention is the provision of an improved conveying system suitable for laundries, cleaning plants, textile processing plants and the like, which is suitable for conveying batches of damp weighty and bulky material and articles from a feeding position to a remote delivering position.

The above, as well as other objects of the invention, will be apparent to persons skilled in the art to which the invention relates, from a consideration of the accompanying drawings and annexed specification illustrating and describing a preferred form of the invention.

In the accompanying drawings I have shown, as one typical embodiment, a system and apparatus suitable for conveying laundered or damp articles from a delivering position to a remote discharge station.

In the drawings—

Fig. 1 is a diagrammatic view of one type of a conveying system embodying the invention;

Fig. 2 is a vertical sectional view of the intake or receiving hopper illustrated in Fig. 1;

Fig. 3 is a longitudinal central sectional view of one form of material-collecting hopper embodying the invention;

Fig. 4 is a transverse central sectional view thereof as taken on the line 4—4 of Fig. 3;

Fig. 5 is a fragmentary longitudinal sectional view of one embodiment of hopper door actuator adaptable for a system embodying the invention; and Fig. 6 is a diagrammatic view of a conveying system embodying a modified embodiment of the invention.

The invention comprises an improved pneumatic conveying system having one or more inlet positions which may be in the form of normally closed receiving hoppers, and pneumatic conveying ducts leading upwardly and/or laterally to one or more normally open collecting hoppers, said ducts being supplied by suction currents of air of desired volume and velocity by means of a fan or the like positioned beyond the collecting hoppers. The system is preferably electrically operated and controlled in such manner that as the fan motor is energized to supply suction to the collecting hopper and ducts, the hopper is automatically closed, and is opened to discharge the material at the discharging station as the fan motor is deenergized. According to one form of the invention, the starting and stopping of the system is automatically controlled by the opening and closing of the receiving hopper. If desired, a plurality of collecting hoppers each supplied by one or more receiving hoppers may be controlled by a single fan.

In the accompanying drawings, there is illustrated diagrammatically, a suitable embodiment of the invention for a typical conveying installation for a laundry or dry cleaning plant, though it is to be understood that such disclosure is merely for the purpose of illustrating and explaining the nature of the invention and that it is useful and applicable to other materials and installations as well.

In the illustrated example, one or more inlet hoppers 10 are provided at desirable receiving positions in the plant, which conveniently may be adjacent certain plant machinery, for example, a dryer or extractor A of a laundry, dry cleaning or textile processing or other plant.

The receiving hoppers 10 may be of any desired construction and shape suitable for the material to be handled and are preferably provided with valves or cutoffs 11 between them and the conveying ducts 13—14, which cutoffs are preferably normally closed to keep the system clean and to increase the efficiency thereof. Desirably, though not necessarily, the inlet hoppers 10 above the cutoffs 11 may be of such size as to hold substantially the entire contents of the machines A, so that the contents thereof may be emptied into the hoppers quickly.

Each of the cutoffs 11 may be of any suitable form and construction suitable for the purpose, and as illustrated, may comprise a cutoff casing 11$^b$ connected to the bottom of the receiving hopper 10 and fitted with a slide 12 adapted in its closed position to close the bottom of the receiving hopper 10. As will be apparent the slide 12 may be moved outwardly in the casing 11b to uncover the bottom of the hopper 10 and place it in communication with a duct 13 leading to a conveying duct 14. The end of the conveying duct 14, adjacent the receiving position, may be fitted with a removable cleanout cap or closure 16, providing a means for access to the duct 14 below the hopper 10 and cutoff 11.

The material-conveying duct 14 extends laterally and, if desired, upwardly to a collector hopper 20 which is preferably above a discharge station D remote from the receiving position adjacent the machine A. In the illustrated embodiment of the invention the major portion of the collector hopper 20 is positioned above the roof R and its discharge outlet below the roof of the building in which the system is installed, and it will be understood that though this is desirable in some installations, it is not essential to the more important features of the invention.

The collector hopper 20 may be constructed of any suitable material and may be of any desired shape. Preferably, it is of a size to provide for non-aligned inlet and outlet ducts and a sufficiently large storage space below said ducts at least equal to the capacity of the one or more inlet hoppers 10 connected therewith. The bottom 21 of the collector hopper 20, which is disposed below the roof R and preferably above a discharge station D, is normally open, and is adapted to be periodically closed by a door 22 controlled by a suitable door-operating mechanism actuated simultaneously with the actuation of the suction fan motor, later to be described.

The collector hopper 20, illustrated herein, is one suitable for the handling of garments and textile fabric articles, such as clothing, towels and the like, and may be of a rectangular box-like shape having inlet and outlet openings 23—24 at opposite ends near the upper portion thereof, thus dividing the hopper 20 into an upper fluid current chamber 25 and a lower collecting or storage chamber 26, the latter having a capacity preferably equal at least to the capacity of the inlet hoppers 10 or of the machines A at the receiving station. The outlet opening 24 leading by duct 27 to a motor driven suction fan 28 is preferably at the upper end of one end wall of the hopper 20 and is screened by an angularly disposed screen 29 bridging the adjoining walls of the hopper to prevent material from being drawn past the hopper into the duct 27. The fineness of the screen will vary, depending upon the size and nature of the material to be handled.

The inlet opening 23 connected to the duct 14 leading from the inlet hopper 10 is preferably in an end of the hopper 20 opposite the outlet opening 24, and may be below the plane of the opening 24. The hopper 20 is provided with a baffle 30 inwardly between the inlet 23 and the screened outlet 24 and preferably this baffle 30 extends angularly downwardly from the top of the hopper to a level at least as low as the bottom of the inlet. In systems for conveying clothing, textile and other bulky articles, the baffle 30 may be and advantageously is perforated as shown, though for smaller size articles and materials it may be imperforate.

The lower end of the collecting or storage chamber 26 of the hopper 20 is provided with a downwardly inclined open bottom 21 adapted to be closed by a door 22 hingedly connected as at 32 to the hopper 20 along the upper edge 22a of the opening 21. Hence, the door 22 is normally opened by the action of gravity, so that the contents of the collecting chamber 26 of the hopper 20 may be discharged at the discharge station D upon a suitable receiving table T or the like.

The hopper door 22 is moved into airtight closing engagement with the hopper discharge opening 21 by a door actuator of suitable design, and preferably this is effected automatically as the suction fan is started to apply suction to the collector and ducts 14 leading to the inlet hoppers 10. The door actuator mechanism may be of any suitable design and construction and preferably is a pneumatically controlled actuator of the general type disclosed in Fig. 5.

As herein illustrated, the door actuator may comprise a cylinder 35, the head end of which is pivotally connected as at 36 to a suitable fixed support 37, and is provided with an inlet opening 38. The cylinder slidably receives a piston rod 39 having a suitable packing head 40 at one end and the opposite end extending through the base end of the cylinder and provided with a clevis 41 pivotally connected to an ear 42 secured centrally to the door 22. The cylinder 35 is adapted to be periodically supplied with a suitable motive fluid, for example air under pressure through inlet 38, to act upon the packing head 40 and move the piston rod outwardly through the base end of the cylinder to close the door. A coil spring 43 surrounding the piston rod between the packing head 40 at the base end of the cylinder acts to return the packing head to its normal position as fluid under pressure is released, and thus assist the force of gravity to open the door 22.

Air under pressure may be supplied to the port 38 of the cylinder from a source of main air supply M in any desired manner. One satisfactory means for accomplishing this result is a solenoid operated valve 45 adapted in its energized position to admit air from the main air supply M to line 46 leading to the port 38 of cylinder 35, and in its deenergized position to exhaust air from line 46 through exhaust port X of the valve 45. The solenoid valve may be connected in the electrical control circuit of the system so as to be energized as the fan motor is started to effect a simultaneous closing of the collector hopper door.

The electric circuit for the system may be of any desired type adapted to energize the fan motor and door actuator control device upon the closing of a starting switch and to deenergize those devices upon opening the starting switch. A simplified two-wire circuit is illustrated in Fig. 1 wherein an electric motor 28a for driving the fan is controlled by an electric circuit consisting of wires 48—49 having one or more manually operated switches 47 located at a suitable point, for example adjacent the receiving or loading position near the inlet hoppers 10. Such manually operated switches may be of any design or type suitable for the particular needs of the installation. The solenoid valve is connected in series in the circuit so that as switch 47 is actuated to close the circuit, the electric motor 28a is started, and the solenoid valve is energized to supply fluid under pressure to line 46 leading to the door-actuating cylinder. As the switch 47 is actuated to break the circuit, the motor 28a is stopped and the valve 45 deenergized. A spring 45a surrounding the valve stem may assist in resetting the valve to its exhaust position.

According to one embodiment of the invention as shown in Fig. 6, the cutoff 11ᵃ of the receiving hopper 10 may be maintained normally closed by means of a spring 50 or the like and may be maintained in its open position by means of a suitable latch 51 or other holding member. The cutoff 11ᵃ in its opened latched position may engage a switch 47ᵃ electrically connected to the fan motor 28ᵃ and the door controller 45 as in the case of the manually controlled switch. Thus the operator may fill the hopper 10, and when a desired amount of material is deposited therein, he may start the system by merely opening the cutoff 11ᵃ to its opened latched position, which automatically starts the fan motor 28ᵃ and effects closing of the hopper discharge door 22.

From the above detailed description it will be apparent to persons skilled in the art that the invention provides a simple, efficient and speedy conveying system for many types of materials. It is particularly effective as a conveying system for damp or partially dry clothing, fabric articles such as towels and the like, and bulky and relatively heavy textile material.

In the preferred form of the invention the system is normally idle or inoperative and is placed in operation only when an operator closes the electrical control by means of the switch 47 or 47ᵃ to thus energize the fan motor 28ᵃ and close the hopper discharge door. This results in economy of operation and a minimum of wear on the fan and fan motor. In cases where the system is to be operated at more frequent intervals the fan motor may be continuously operated and the hopper discharge door only controlled by the starting switch.

Obviously the invention is not to be restricted to the details of construction and arrangements shown and described, which are intended as illustrative only, as the scope of the invention is best defined in the appended claims.

I claim:

1. A collecting hopper for pneumatic conveying systems comprising a relatively large receptacle provided with a material inlet and a suction outlet adjacent the upper end and on opposite sides thereof, said hopper being formed with a substantially vertically walled chamber therein having a downwardly sloping discharge opening below the material inlet, a closure hingedly connected to the hopper along the upper edge of the opening so as normally to be spaced by gravity from said sloping discharge opening, an actuating rod pivotally connected to said closure, a cylinder and piston device connected to said rod, valve means for admitting fluid under pressure to one end of said cylinder to move the closure to close the opening of said hopper, and spring means for opening said closure when said valve means terminates the flow of fluid under pressure to said cylinder.

2. A pneumatic conveyor system comprising spaced inlet and collecting hoppers, a duct connecting said hoppers, said collecting hopper having a discharge opening adjacent the lower portion thereof, a normally open closure for said opening, normally idle means for applying suction in the collecting and inlet hoppers, power operated closure actuating means connected to said closure for closing the discharge opening of said collecting hopper, electrically operated means for controlling operation of said power operated closure actuating means in one direction, said electrically operated means being actuated as a result of actuating the suction-applying means.

3. A pneumatic conveyor system comprising spaced inlet and collecting hoppers, a duct connecting said hoppers, said collecting hopper having a discharge opening adjacent the lower portion thereof, a normally open closure for said opening, normally idle electrically operated means for applying suction in the collecting and inlet hoppers, fluid pressure operated closure-actuating means connected to said closure for actuating it to close the discharge opening of the collecting hopper and electrically operated means for actuating said closure actuating means when the suction-applying means is in operation.

4. A pneumatic conveyor system comprising spaced inlet and collecting hoppers, a duct connecting said hoppers, said collecting hopper having a discharge opening adjacent the lower portion thereof, a normally open closure for said opening, normally idle means for applying suction in the collecting and inlet hoppers, power operated closure actuating means connected to said closure for moving it to close the discharge opening of said collecting hopper, an electrical control for the system including a manually operable switch member adjacent the inlet hopper and electrical connections from said switch to said closure actuating means and suction applying means, said electrical control being operable to simultaneously cause actuation of said closure actuating means and suction applying means to close said closure and to place the system under suction.

5. A pneumatic conveyor system comprising spaced inlet and collecting hoppers, a duct connecting said hoppers, said collecting hopper having a discharge opening adjacent the lower portion thereof, a normally open closure for said opening, normally idle means for applying suction in the collecting and inlet hoppers, fluid pressure operated closure actuating means connected to said closure for closing the discharge opening of said collecting hopper, electrically operated valve means for admitting fluid under pressure to said closure actuating means to actuate it in one direction, said electrically operated valve means being actuated as a result of actuating the suction applying means.

6. A pneumatic conveyor system comprising spaced inlet and collecting hoppers, a duct connecting said hoppers, said collecting hopper having a discharge opening adjacent the lower portion thereof, a normally open closure for said opening, normally idle means for applying suction in the collecting and inlet hoppers, power operated closure actuating means connected to said closure for closing the discharge opening of said collecting hopper, said closure actuating means including a spring member operative normally to maintain said closure in open position, valve means for admitting fluid under pressure to said closure actuating means to move said closure to closed position, and connections for actuating said valve means as a result of the actuation of said suction applying means.

7. A pneumatic conveying system for bulky textile fabric articles and the like comprising a receiving hopper, a cut-off therefor, a remotely spaced collecting hopper pneumatically connected thereto and provided with a discharge opening in the lower end thereof, a normally open closure for said opening, fluid pressure operated means for moving said closure to closed position, means for applying suction in said collecting hopper, and electrical connections operative to admit fluid under pressure to said fluid pressure operated means and to simultaneously actuate said suction applying means, said suction applying means being rendered effective to remove articles from the collecting hopper to the receiving hopper upon opening the cutoff therefor.

8. A pneumatic conveyor system for bulky textile fabric articles and the like comprising spaced receiving and collecting hoppers, a duct connecting said hoppers, means for applying suction in said hoppers, said collecting hopper comprising a substantially vertically walled chamber having an angularly disposed discharge opening adjacent the bottom thereof, a hinged closure for said opening, spring means acting normally to open said closure, a fluid pressure operated means for moving said closure to closed position, valve means for admitting fluid under pressure to the closure moving means, and manual control means disposed adjacent said receiving hopper for operating said valve means.

WILLIAM BOON.

REFERENCES CITED

The following references are of record in the file of this patent:

UNITED STATES PATENTS

| Number | Name | Date |
| --- | --- | --- |
| 813,073 | Allen | Feb. 20, 1906 |
| 851,054 | Bassler | Apr. 23, 1907 |
| 1,796,747 | Colby et al. | Mar. 17, 1931 |
| 1,937,158 | Lorenz | Nov. 28, 1933 |
| 1,957,224 | Neuman et al. | May 1, 1934 |
| 2,035,410 | Smith | Mar. 24, 1936 |
| 2,149,056 | Klux | Feb. 28, 1939 |